UNITED STATES PATENT OFFICE.

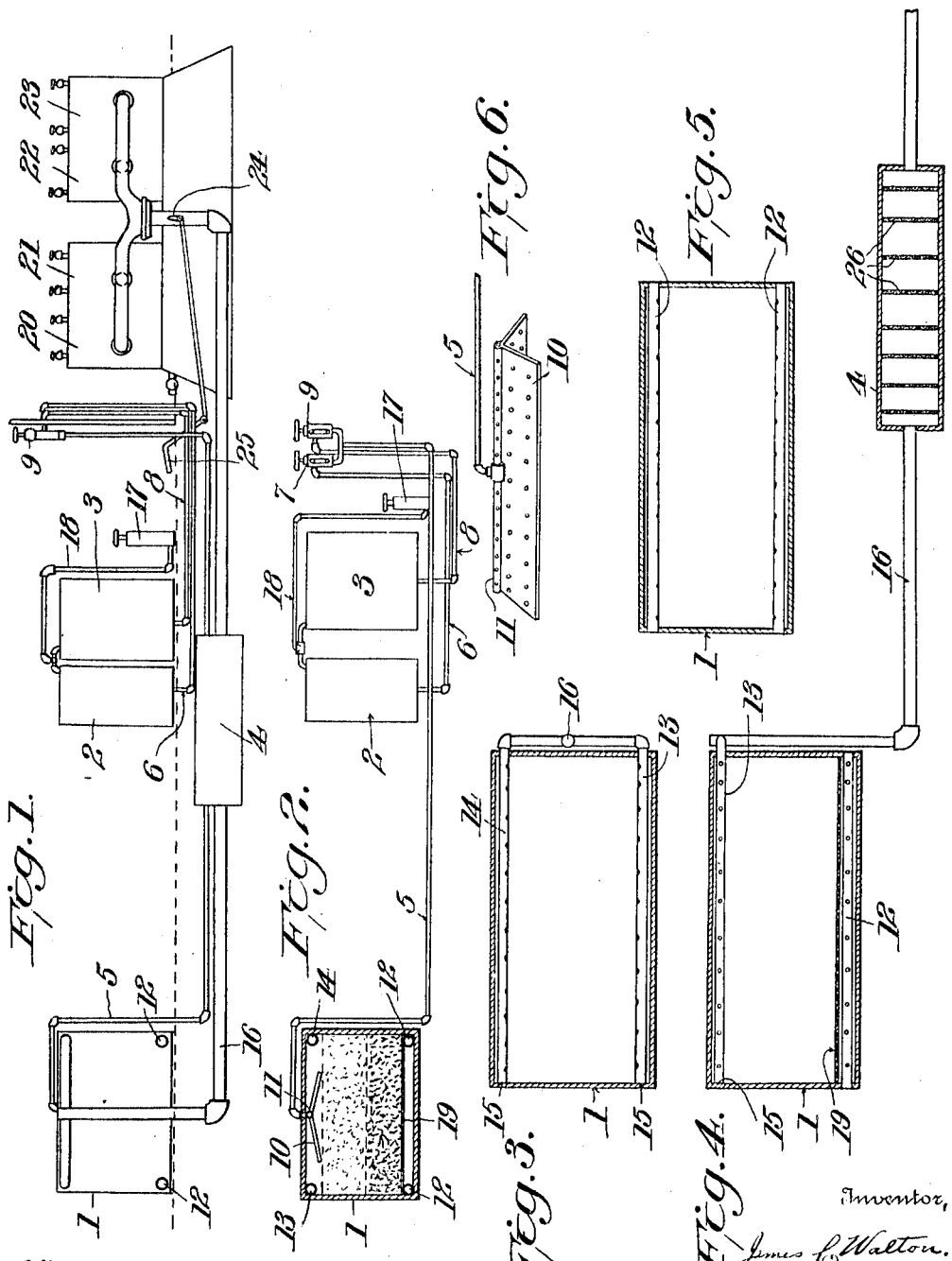

JAMES C. WALTON, OF FORT WORTH, TEXAS, ASSIGNOR OF ONE-HALF TO JOHN A. WISHERD, OF STANTON, NEBRASKA.

GAS-GENERATOR.

1,118,319.  Specification of Letters Patent.  Patented Nov. 24, 1914.

Application filed May 1, 1913. Serial No. 764,803.

*To all whom it may concern:*

Be it known that I, JAMES C. WALTON, a citizen of the United States, residing at Fort Worth, in the county of Tarrant and State of Texas, have invented certain new and useful Improvements in Gas-Generators, of which the following is a specification.

My invention relates to gas generators and more particularly gas generators for manufacturing carbureted hydrogen gas, and the object is to provide generators and coöperating apparatus which are particularly adapted for use on automobiles or other vehicles for driving and lighting purposes and to provide means for quickly and efficiently regulating the supply of gas to be manufactured.

Other objects and advantages will be fully explained in the following description and the invention will be more particularly pointed out in the claims.

Reference is had to the accompanying drawings which form a part of this application.

Figure 1 is a diagrammatic side elevation of the generator and other apparatus, designed for use on an automobile. Fig. 2 is a vertical section of the generator, and a diagrammatic view of the apparatus for charging the generator. Fig. 3 is a horizontal section of the generator, taken above the gas collecting or discharging pipes. Fig. 4 is a vertical section of the generator, showing the air intake pipes and showing a section of the regulator. Fig. 5 is an inverted horizontal section of the generator, showing the air intake pipes. Fig. 6 is a detail view of the distributer.

Similar characters of reference are used to indicate the same parts throughout the several views.

The apparatus includes a generator 1, an acid tank 2, and an oil tank 3 with necessary pipe connections and a back-check 4. The generator is charged with scraps of iron or other metal to be treated with acids. The acid and the oil are fed through a single pipe 5. A pipe 6 leads from the acid tank 2 to a cock 7 and a pipe 8 leads from the oil tank 3 to a cock 9 and these two cocks feed to the mixing and conveying pipe 5 which delivers the mixed acid and oil to the generator tank 1 and the acid and oil are discharged from the pipe 5 onto a baffle 10 which is perforated for the purpose of distributing the mixed ingredients to the contents of the generator. The pipe 5 is connected with a perforated pipe 11 which extends along the crest of the baffle 10. The pipe 11 is horizontally disposed so that the mixed ingredients will be uniformly distributed to the metal scraps in the generator tank. Perforated pipes 12 are provided in the lower part of the generator tank 1 for admission of air, as hereinafter described. Gas is generated and the gas is taken from the generator by two perforated pipes 13 and 14 which are located within the generator 1 and are soldered to the generator at 15 and extended out of the generator and connected with a service pipe 16. Air is forced into the tanks 2 and 3 by an air-pump 17 which is provided with a pipe 18 leading from the pump to the tanks 2 and 3. The pipe 18 is connected with the tanks 2 and 3 and air is forced within these tanks. The air will collect on top of the liquids in these tanks and exert pressure on the surfaces of the liquids and thus force the liquids out of these tanks through the pipes 6 and 8, through sight feed valves 7 and 9 into mixing pipe 5, and through this pipe 5 and the perforated pipe 11 to the baffle-plate 10.

A false perforated bottom 19, located just above the perforated air pipes 12, forms an air chamber so that air will be fed uniformly from the pipes 12. The pipe 16 is connected to the engine cylinders 20, 21, 22, and 23. The engine cylinders draw the air through pipes 12 into the generator in contact with the elements which produce the gas. No further mixing of air with the gas is required. The gas which is passing through pipe 16 to the engine cylinders already contains the necessary air. On every impulse of the engine, air is drawn into the generator. A valve 24 of any suitable design, such as a butterfly valve, is used to control the force of the draft through the pipe 16 and consequently the amount of air drawn into the generator through pipes 12. A pedal 25 is operatively connected to the valve 24 to control this valve. The back-check 4 is provided with screens 26 of any suitable material to coöperate with the screen in the bottom of the manifold of the engine to prevent back-firing. The screens 26 also serve to hold enough gas for charging the engine after each explosion.

Various changes in the construction and assembling of the various elements may be made without departing from my invention.

The generator is intended to generate gas only during the operation of the engine. Air is drawn into the generator only on the intake of the engine. The gas which is held by the back-check 4 being taken into the engine will tend to create a vacuum. This will cause an intake of air into the generator through pipes 12. The supply of acids and oil from vessels 2 and 3 is controlled by the sight feed valves 7 and 9, which are located at a convenient place for the operator, as on the dashboard of the vehicle. The acid causes a release of hydrogen in the generator and the hydrogen is carbureted by the air and the hydrocarbon oil. It is apparent that by the construction of the generator that there can be no explosion. If a surplus of gas is generated it will find its way out through the pipes 12. The generator serves as a kind of carbureter for the engine and consequently the engine is not provided with a carbureter.

What I claim, is,—

1. Apparatus for manufacturing gas comprising a generator tank, metal scraps in said tank, perforated pipes in the lower part of said tank communicating with the atmosphere at both ends, acid and oil tanks, pipes connected with said acid and oil tanks, a mixing pipe connected to said pipes and to said generator tank, a perforated pipe connected to said mixing pipe and a baffle plate connected to said perforated pipe, perforated pipes in the upper part of said generator and extending to the outside of said generator, and a service pipe connected to said last mentioned pipes.

2. Apparatus for generating gas comprising a generator tank, metal scraps in said tank, perforated pipes in said tank communicating with the atmosphere at both ends for receiving air, means for mixing acids and oils and feeding the same to the interior of said tank, a baffle plate for spreading the acids and oils to all parts of the tank, perforated pipes in said tank and extending out of the tank, a service pipe connected to said perforated pipes, and a back-check attached to said service pipe.

3. Apparatus for generating gas comprising a generator tank, metal scraps in said tank, perforated pipes in said tank communicating with the atmosphere at both ends for receiving air, means for drawing the air in said tank automatically and intermittently, acid and oil tanks and pipes therefor connecting said tanks to said generator tank and mixing the oil and acid in transit, means for forcing the oil and acid by pneumatic pressure into the generator tank, a baffle plate for distributing the liquid mixture throughout the generator tank, and a service pipe connected to said generator tank.

4. Apparatus for generating gas comprising a generator tank, metal scraps in said tank, means for feeding acids and hydrocarbon oils under pressure to said generator tank, perforated air feeding pipes in the lower part of said tank communicating with the atmosphere at both ends, a perforated pipe within the generator tank for distributing the oil and acid to all parts of the generator, a baffle plate having slanting wings and attached to said perforated pipe at the highest point of the baffle plate, and a service pipe connected to the generator tank.

5. The combination with a generator comprising a generating apparatus, including a tank, perforated air pipes in said tank and communicating with the atmosphere, means for supplying oil and acid within said tank, and a gas service pipe connected to said tank and means whereby air is drawn into said tank.

6. The combination of a generator, perforated pipes in said generator communicating with the atmosphere, perforated gas pipes in said generator at the opposite side from the first named perforated pipes and extended out of said generator, and open to the atmosphere, means for supplying oil and acid to the generator, a service pipe connected to said gas pipes and means whereby the air is drawn into and through the generating tank, and a back-check intercepting the last named pipe to prevent back-firing into said generator.

7. The combination of a generator having a gas generating tank, perforated air intake pipes in said tank and communicating with the atmosphere, perforated gas pipes in said tank at the opposite side from said air inlet pipes and extended out of said tanks, means whereby the air is drawn into and through said generating tank, and a service pipe connected to said gas pipes.

8. The combination of a gas generator having a gas generating tank provided with an air chamber therein, perforated air intake pipes in said chamber and communicating with the atmosphere, means for supplying oil and acid to said generator, means whereby the air is drawn into and through said generating tank, perforated gas pipes in said tank at the opposite side from said air intake pipes, a service pipe connected to said gas pipes, a back-check intercepting said service pipe to prevent back-firing, and a valve for controlling the amount of gas fed to said service pipe.

9. Apparatus for manufacturing gas comprising a generator tank, a porous mass of metal in said tank, means for feeding oils and acids throughout said mass of metal, perforated air pipes disposed on the bottom of said tank and having both ends communicating with the atmosphere, perforated gas pipes disposed in the upper part of said tank and having imperforate portions extending to the outside of the tank, a service pipe connected to said gas pipes, and means for drawing the gas through said pipes.

10. Apparatus for manufacturing gas comprising a generator tank, metal scraps forming a porous mass within said tank, means for feeding mixed oils and acids to said mass, perforated air receiving pipes disposed in the lower part of said tank and communicating with the atmposphere at both ends, perforated gas pipes disposed in the upper part of said tank and having imperforate portions extending to the outside of the tank, a service pipe communicating with said gas pipes, and means for drawing the gas through said gas pipes and service pipe.

11. Apparatus for manufacturing gas comprising a generator tank, metal scraps forming a porous mass within said tank, means for feeding gas making liquids throughout said mass, perforated air receiving pipes disposed in the lower part of said tank and communicating with the atmosphere at both ends of the pipes, perforated gas pipes in the upper part of said tank and having imperforate portions extending outside of the tank and united into a single pipe, a service pipe connected to said pipes at their junction, and means whereby the air is drawn into and through said generating tank.

12. The combination of a gas generator having a tank, metal scraps within said tank forming a porous mass within the tank, means for feeding gas making liquids to said mass, perforated air pipes disposed in the lower part of the tank and communicating with the atmosphere at both ends, a perforated partition horizontally disposed in said tank and separating said metal from said pipes, perforated gas pipes in the upper part of said tank, a service pipe connected at one end with said gas pipes and means whereby air is forced into said tank.

In testimony whereof, I set my hand in the presence of two witnesses, this 28th day of April, 1913.

J. C. WALTON.

Witnesses:
A. L. JACKSON,
J. W. STITT.

Copies of this patent may be obtained for five cents each, by addressing the "Commissioner of Patents, Washington, D. C."